(12) United States Patent
Cheng et al.

(10) Patent No.: US 8,047,676 B2
(45) Date of Patent: Nov. 1, 2011

(54) ILLUMINATING DEVICE

(75) Inventors: Yi-Kai Cheng, Miao-Li Hsien (TW);
Jyh-Long Chern, Miao-Li Hsien (TW);
Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 237 days.

(21) Appl. No.: 12/491,238

(22) Filed: Jun. 25, 2009

(65) Prior Publication Data

US 2010/0039812 A1 Feb. 18, 2010

(30) Foreign Application Priority Data

Aug. 14, 2008 (CN) .......................... 2008 1 0303756

(51) Int. Cl.
*F21V 1/00* (2006.01)
(52) U.S. Cl. ........ 362/241; 362/240; 362/245; 362/346; 362/350

(58) Field of Classification Search .................. 362/241, 362/244, 245, 246, 606, 607, 612, 613, 378, 362/619, 620, 330, 331, 332, 333, 335, 346, 362/350
See application file for complete search history.

(56) References Cited

U.S. PATENT DOCUMENTS

| 4,251,453 | A | * | 2/1981 | Garrison ....................... 556/188 |
| 4,345,308 | A | * | 8/1982 | Mouyard et al. .............. 362/332 |
| 2006/0139942 | A1 | * | 6/2006 | Pond et al. ..................... 362/545 |

FOREIGN PATENT DOCUMENTS

| CN | 1987611 A | 6/2007 |
| CN | 101188261 A | 5/2008 |

* cited by examiner

*Primary Examiner* — John A Ward
(74) *Attorney, Agent, or Firm* — Altis Law Group, Inc.

(57) ABSTRACT

An exemplary illuminating device comprises a light source module, a light reflective module, a lens array and a light transmissive module. The lens array is for expanding a light field of the illuminating device along a first direction and compressing the light field of the illuminating device along a second direction. The light transmissive module comprises a first surface facing towards the lens array and a second surface opposite to the first surface. The second surface has a plurality of microstructures formed thereon thereby expanding the light field of the illuminating device along the first direction.

15 Claims, 9 Drawing Sheets

ial Field

The present disclosure generally relates to illuminating devices, particularly, to an illuminating device having improved utilization rate.

2. Discussion of Related Art

With the continuing development of scientific technology, light emitting diodes (LEDs) have been widely used in illumination devices to substitute for conventional cold cathode fluorescent lamps (CCFL) due to their high brightness, long life-span, and wide color gamut.

Figure 9:
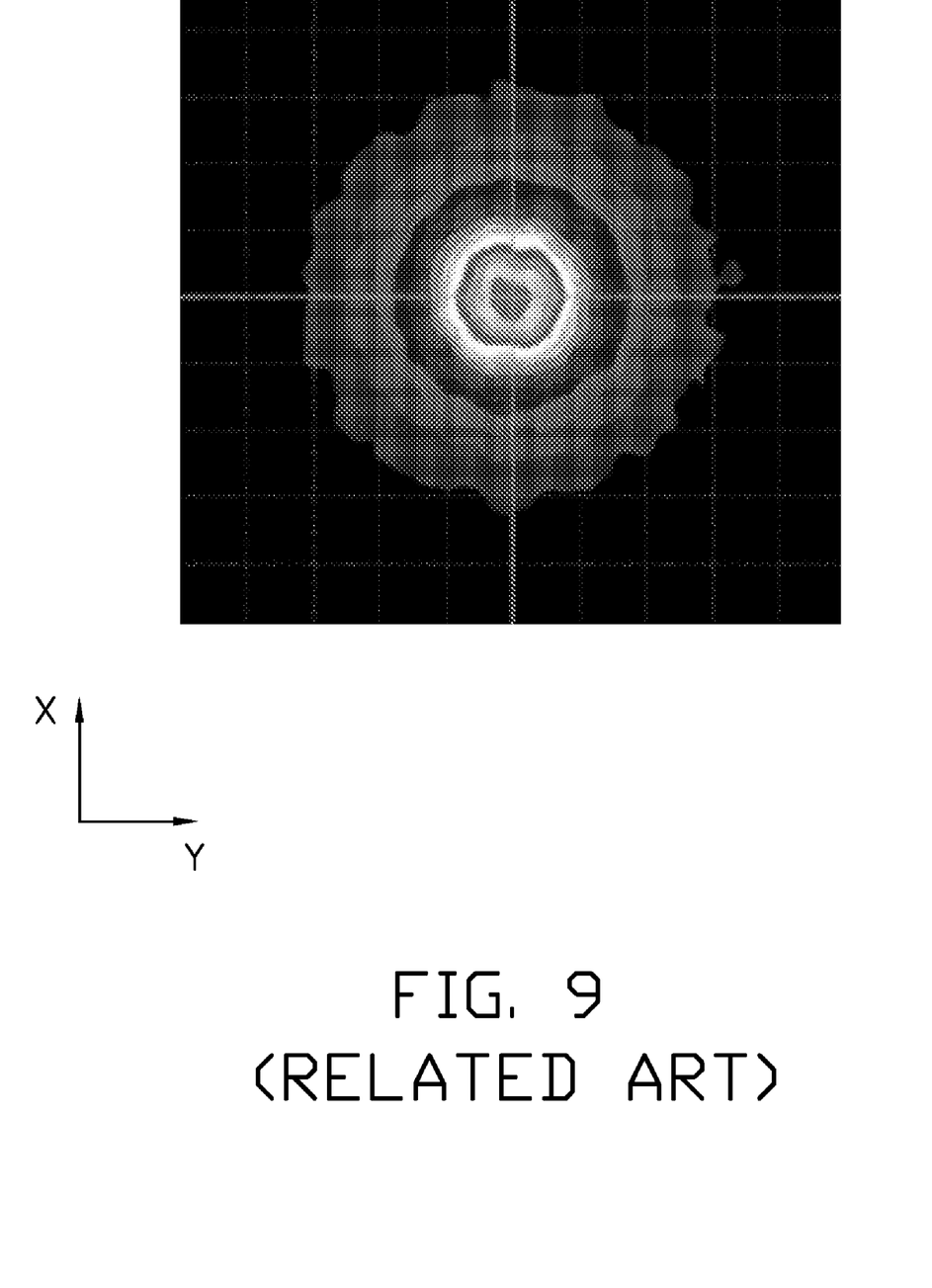
FIG. 9 is a graph showing a light field of a conventional illuminating device.

Conventional illuminating devices incorporating LEDs generally generate butterfly-type light fields or diffusion-type light fields. Referring to FIG. 9, a diffusion-type light field is shown. The diffusion-type light field is substantially circular. In other words, a part of the light field along an x-direction is substantially the same as a part of the light field along a y-direction. However, this type of light field is not a good fit for street lights, which usually requires a strip-type light field. If the diffusion-type light field is applied in the street lamp, part of light will be lost, which decreases utilization rate of the light emitted from the LEDs.

What is needed, therefore, is an illuminating device which can improve utilization rate of the light emitted from LEDs.

BRIEF DESCRIPTION OF THE DRAWINGS

Many aspects of the present illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views, wherein.

DETAILED DESCRIPTION OF THE PREFERRED EMBODIMENTS

Reference will now be made to the drawings to describe the embodiments of the present illuminating device, in detail.

Figure 1:
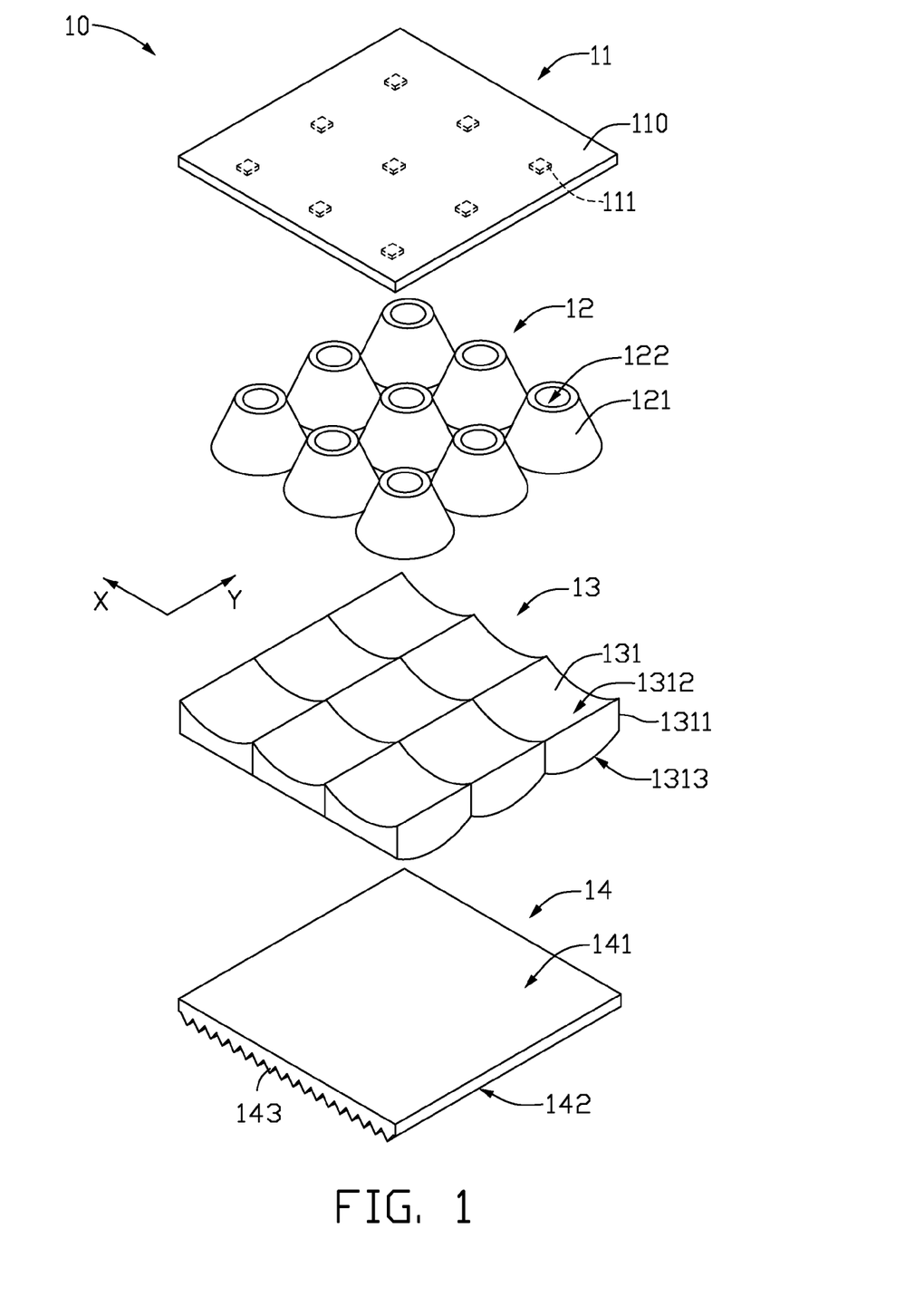
FIG. 1 is a schematic, exploded view of an illuminating device, in accordance with a first embodiment of the present disclosure.

Referring to FIG. 1, an illuminating device 10, according to a first exemplary embodiment is provided. The illuminating device 10 includes a light source module 11, a light reflective module 12, a lens array 13 and a light transmissive module 14.

The light source module 11 includes a base plate 110 and a plurality of solid state light emitting elements 111 arranged in columns and rows on the base plate 110. The solid state light emitting elements 111 can be light emitting diodes or light emitting diode chips.

The light reflective module 12 includes a plurality of light reflective elements 121 arranged in columns and rows. Each of the light reflective elements 121 is generally a hollow truncated cone tapering from a wide opening to a narrow opening thereof. When the light source module 11 and the light reflective module 12 are assembled together, all the narrow openings of the light reflective elements 121 is covered by the base plate 110, and each solid state light emitting element 111 is arranged in a respective light reflective element 121. Each light reflective element 121 has a reflective inner surface 122. The reflective inner surface 122 is configured for reflecting light emitted from the solid state light emitting elements 111 to the lens array 13 through the wide openings of the light reflective elements 121.

The lens array 13 is arranged at the wide opening side of the light reflective elements 121. The lens array 13 includes a plurality of lenses 1311 arranged in columns and rows, the lenses 1311 aligned with and facing towards the respective light reflective elements 121. Each of the lenses 1311 has a light incident surface 1312 facing towards one corresponding wide opening of the light reflective elements 121 and a light emitting surface 1313 opposite to the light incident surface 1312.

The light incident surfaces 1312 receive light transmitted through the light reflective elements 121. The incident surface 1312 is a concave curved surface. In the present embodiment, the concave curved surface is a portion of an inner side surface of a cylinder. The light incident surface 1312 extends along the y-direction and executes a light diverging function. As such, the concave curved surface enables the light passing therethrough to radially deflect from the x-direction. In other words, the light is deflected from a center towards two sides of the light incident surface 1312. As a result, a light radiation range of the illuminating device 10 is enlarged in the x-direction. That is, a part of the light field along the x-direction generated by the solid state light emitting elements 111 is expanded after passing through the incident surface 1312.

The light emitting surface 1313 is a convex curved surface. In the embodiment, the convex curved surface is a portion of an outer side surface of a cylinder. The light emitting surface 1313 extends along the x-direction and executes a light converging function. As such, the convex curved surface enables the light passing therethrough to deflect from two sides towards a center of the light emitting surface 1313. As a result, a light radiation range of the illuminating device 10 is reduced in the y-direction. That is, a part of the light field along the y-direction generated by the solid state light emitting elements 111 is compressed after the light passes through the light emitting surface 1313.

A curvature of the light incident surfaces 1312 can be changed, so as to obtain a desired illuminating length and intensity of the light field along the x-direction. A curvature of the light emitting surface 1313 can be changed to obtain a desired illuminating length and intensity of the light field along the y-direction. As a result, the illuminating device 10 can satisfy different requirements merely by changing the curvatures of the light incident surfaces 1312 and the light emitting surface 1313. Thereby, the illuminating device 10 is capable of having predetermined shape of light field and utilization rate of the light is improved.

Figure 2:
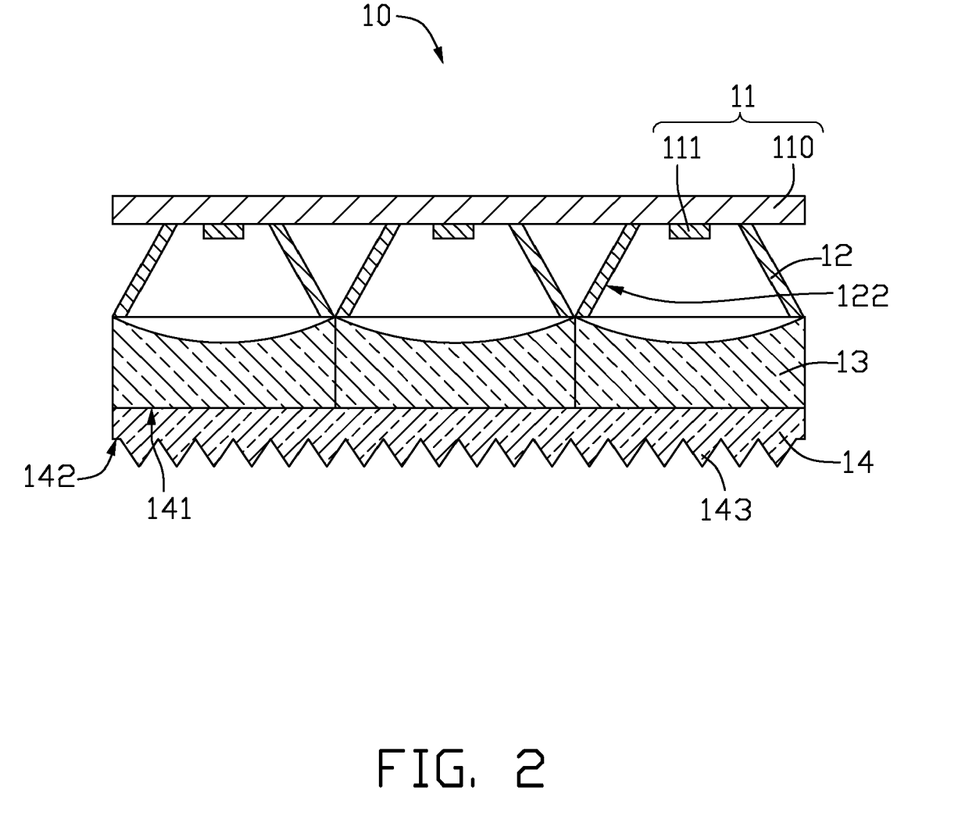
FIG. 2 is a cross-sectional view of the illuminating device, in accordance with the first embodiment of the present disclosure.

The light transmissive module 14 includes a first surface 141 facing towards the light emitting surface 1313 of the lens array 13, and a second surface 142 opposite to the first surface 141. The second surface 142 has a plurality of microstructures formed thereon. In an exemplary embodiment, referring to FIG. 2, the second surface 142 has a plurality of prism protrusions 143 formed thereon. The prism protrusions longitudinally extend along the y-direction as illustrated in FIG. 1 (in FIG. 2, the y-direction is perpendicular to the paper plane). Thus, light transmitted from the lens array 13 is radially deflected from the x-direction and the light field of the illuminating device 10, and expanded along the x-direction at a more advanced stage.

Figure 3:
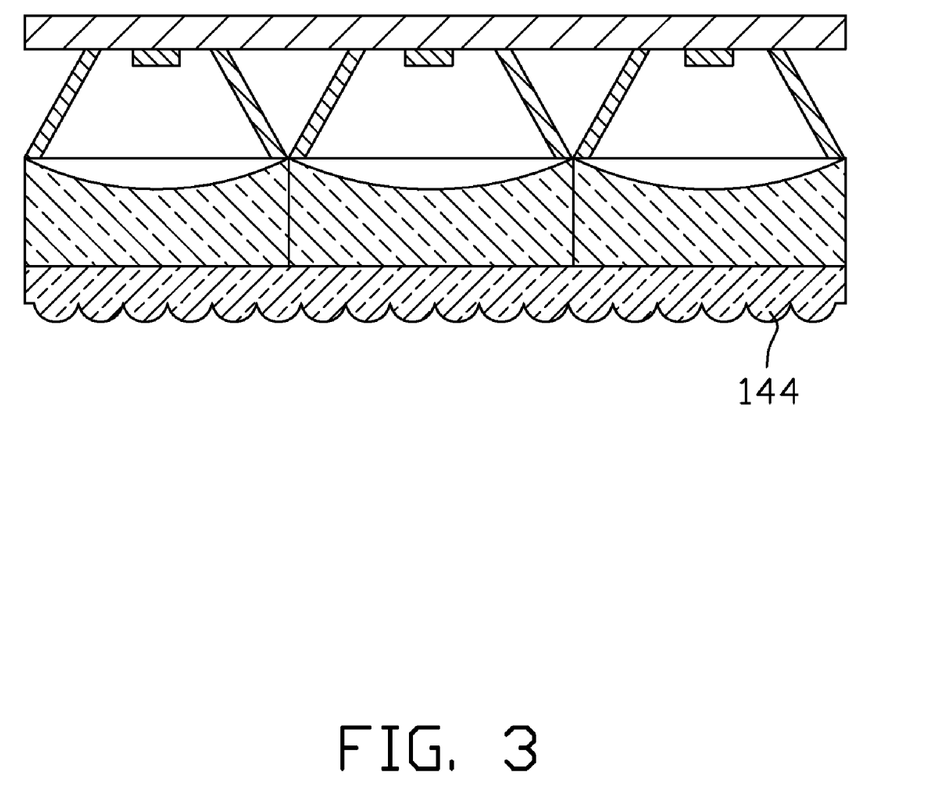
FIG. 3 is a cross-sectional view of an illuminating device according to a first variation of the first embodiment.
Figure 4:
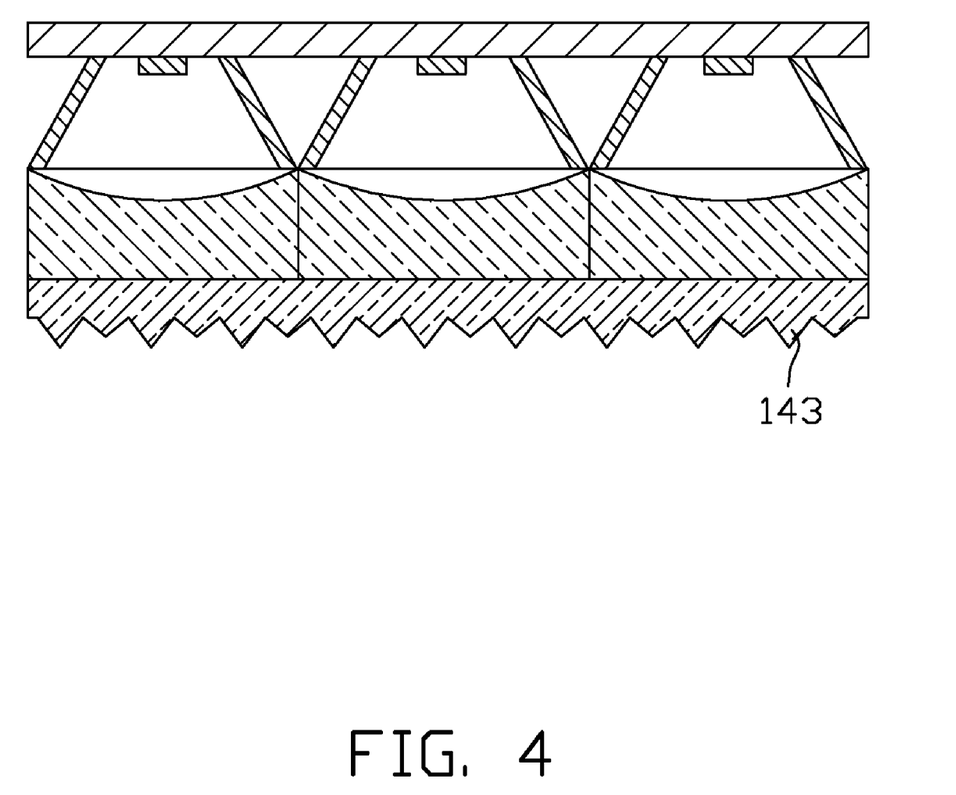
FIG. 4 is a cross-sectional view of an illuminating device according to a second variation of the first embodiment.
Figure 5:
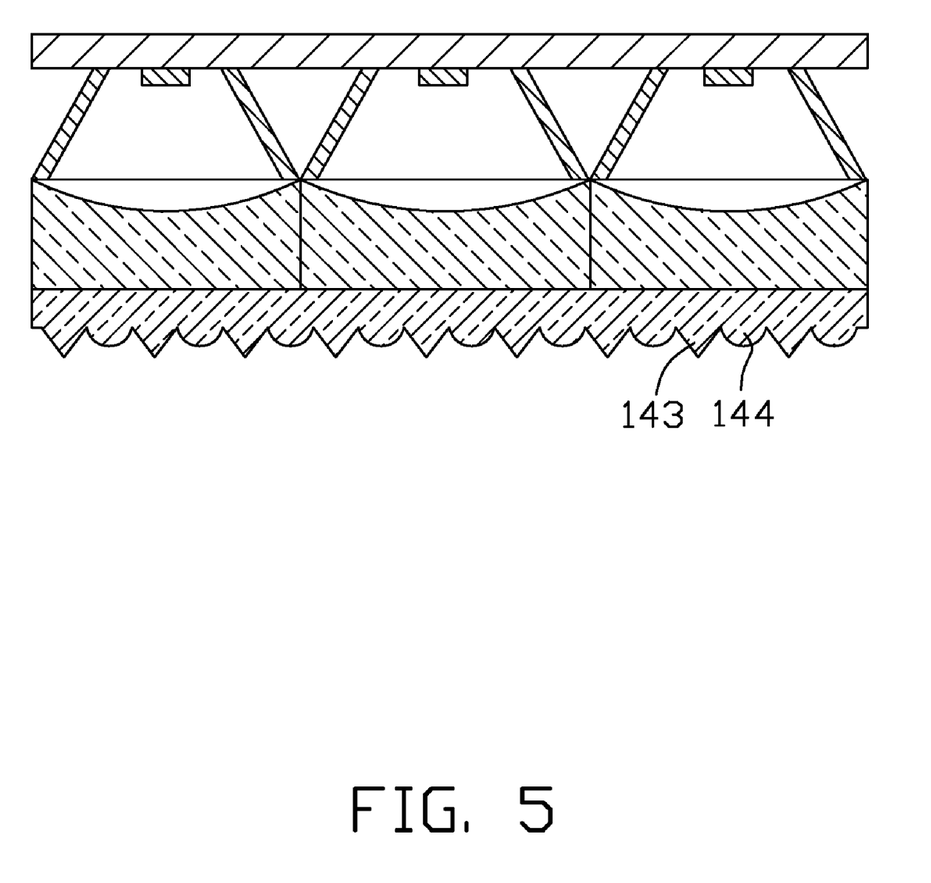
FIG. 5 is a cross-sectional view of an illuminating device according to a third variation of the first embodiment.

The microstructures on the second surface 142 is not limited to be V-grooves. Referring to FIG. 3, the light transmissive module 14 can also be semi column shaped protrusions 144 longitudinally extending along the y-direction, thereby executes a light diverging function. Referring to FIG. 4, the microstructures can also be prism protrusions 143 with different sizes longitudinally extending along the y-direction. Referring to FIG. 5, the microstructures can also be consisted of prism protrusions 143 and semi column shaped protrusions 144, all of which longitudinally extending along the y-direction. In an exemplary embodiment, the prism protrusions and the semi column shaped protrusions are alternately arranged along the x-direction.

Figure 6:
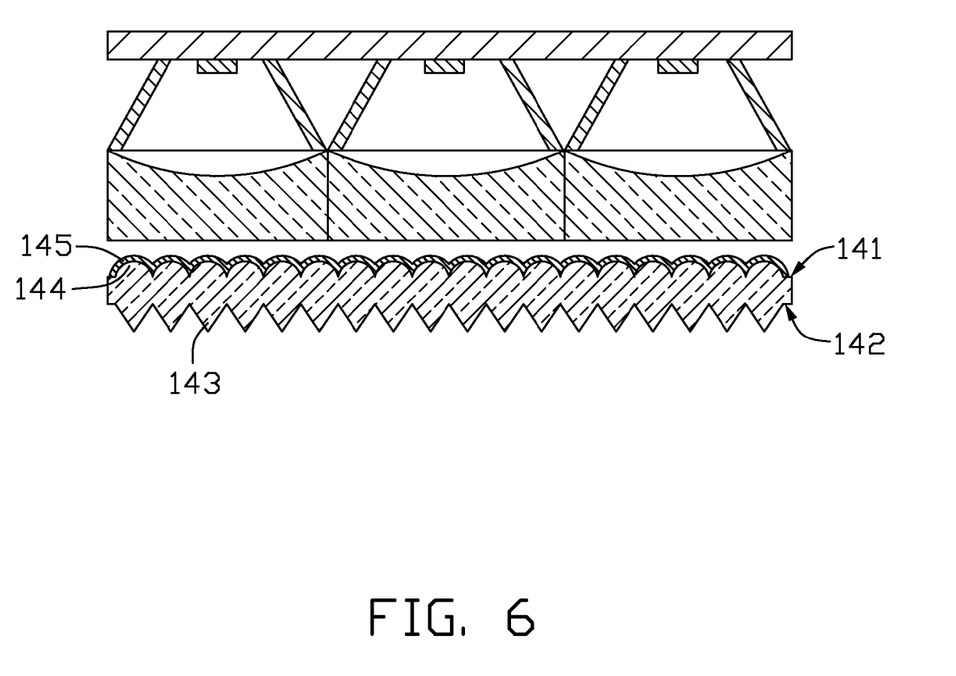
FIG. 6 is a cross-sectional view of an illuminating device according to a fourth variation of the first embodiment.

The microstructures is not limited to be formed only on the second surface 142. Referring to FIG. 6, the first and second surfaces 141, 142 both have microstructures thereon. The first surface 141 has a plurality of semi column shaped protrusions 144 longitudinally extending thereon. The second surface 142 has a plurality of prism protrusions 143 longitudinally extending thereon. The light transmissive module 14 can further have an anti reflection film 145 formed on the semi column shaped protrusions 144. The anti reflection film 145 covers the semi column shaped protrusions 144 and is used to improve optical transmissivity thereof.

Figure 7:
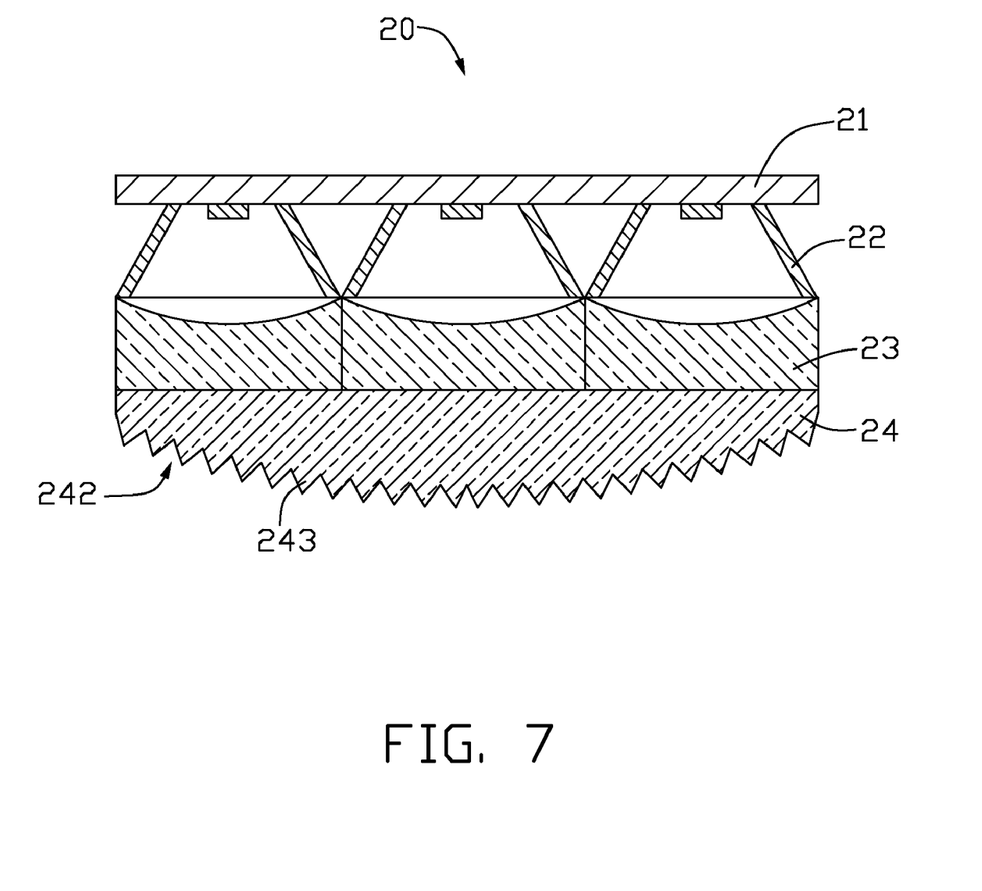
FIG. 7 is a cross-sectional view of an illuminating device, in accordance with a second embodiment of the present disclosure.

Referring to FIG. 7, an illuminating device 20, according to a second exemplary embodiment, includes a light source module 21, a light reflective module 22, a lens array 23 and a light transmissive module 24. The illuminating device 20 has a configuration similar to that of the illuminating device 10. The main difference is that the light transmissive module 24 has a first circular cambered surface 242, with an exterior convexity of the circular cambered surface 242 facing away from the lens array 23. Further, the first circular cambered surface 242 has a plurality of prism protrusions 243 formed thereon. The prism protrusions 243 longitudinally extend along a direction perpendicular to the paper plane.

Figure 8:
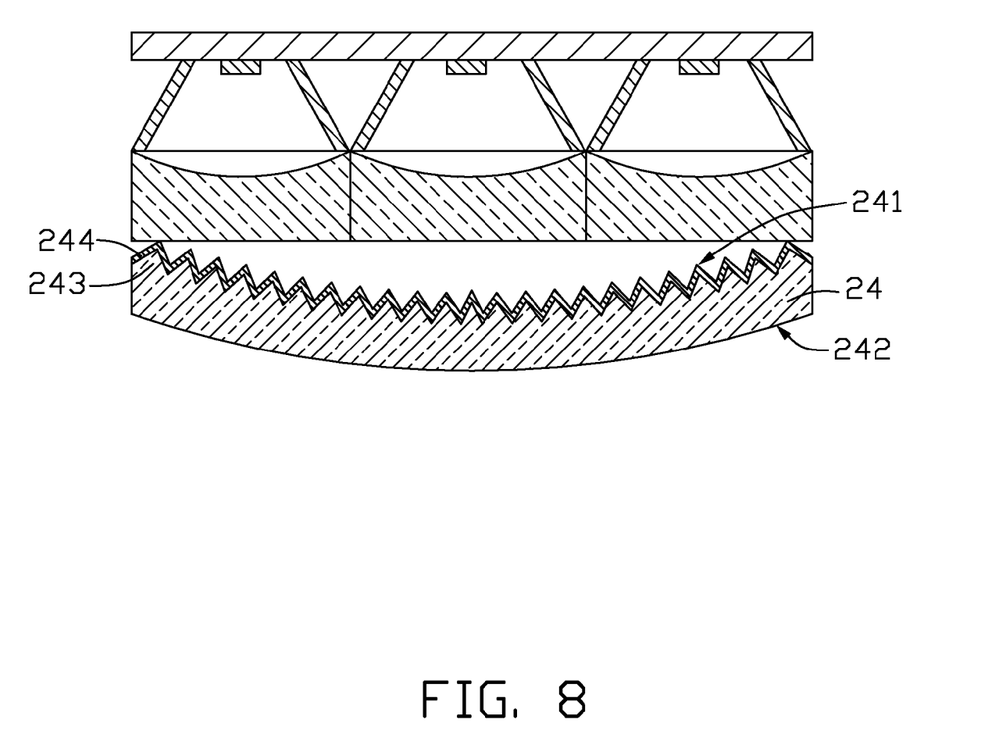
FIG. 8 is a cross-sectional view of an illuminating device according to a variation of the second embodiment.

In an variation embodiment, referring to FIG. 8, the light transmissive module 24 further has a second circular cambered surface 241 with an exterior concavity facing towards the lens array 23. The plurality of prism protrusions 243 are formed on the second circular cambered surface 241 and the first circular cambered surface 242 has no micro structures formed thereon. The prism protrusions 243 longitudinally extend along a direction perpendicular to the paper plane. The light transmissive module 24 can further have an anti reflection film 244 formed on the prism protrusions 243. The anti reflection film 244 covers the prism protrusions 243 and is used to improve optical transmissivity thereof.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. An illuminating device, comprising a light source module, a light reflective module, a lens array and a light transmissive module, wherein:
    the light source module comprises a plurality of solid state light emitting elements arranged in columns and rows;
    the light reflective module comprises a plurality of hollow light reflective elements arranged in columns and rows, the light reflective elements aligned with the respective solid state light emitting elements, each of the light reflective elements configured for receiving a corresponding solid state light emitting element therein and reflecting light emitted from the solid state light emitting element to the lens array;
    the lens array comprises a plurality of lenses arranged in columns and rows, the lenses aligned with and facing towards the respective light reflective elements, the plurality of lenses configured for enlarging light radiation range in the column direction and reducing light radiation range in the row direction;
    the light transmissive module comprises a first surface facing towards the lens array and a second surface opposite to the first surface, the first surface configured for receiving the light emitting from the lens array, and the second surface configured for expanding the light radiation range in the column direction.

2. The illuminating device according to claim 1, wherein each of the light reflective elements is generally a hollow truncated cone tapering from a wide opening to a narrow opening thereof, the solid state light emitting element is received in the narrow opening, whereby the light emitted from the solid state light emitting elements is reflected to the lens array through the wide openings of the light reflective elements.

3. The illuminating device according to claim 1, wherein each of the plurality of lenses comprises-a light incident surface facing towards the light reflective elements and a light emitting surface opposite to the light incident surface, the light incident surface is a concave curved surface elongated along the row direction, and the light emitting surface is a convex curved surface elongated along the column direction.

4. The illuminating device according to claim 1, wherein the second surface has a plurality of microstructures formed thereon, and the microstructures are a plurality of prism protrusions extending along the row direction.

5. The illuminating device according to claim 4, wherein at least two of the prism protrusions have different sizes.

6. The illuminating device according to claim 1, wherein the second surface has a plurality of microstructures formed thereon, and the microstructures are semi column shaped protrusions extending along the row direction.

7. The illuminating device according to claim 1, wherein the second surface has a plurality of microstructures formed thereon, and the microstructures comprises prism protrusions extending along the row direction and semi column shaped protrusions extending along the row direction.

8. The illuminating device according to claim 7, wherein the prism protrusions and the semi column shaped protrusions are alternately arranged along the column direction.

9. The illuminating device according to claim 1, wherein the first surface has a plurality of semi column shaped protrusions thereon, the second surface has a plurality of prism protrusions formed thereon, and the semi column shaped protrusions and prism protrusions extend along the row direction.

10. The illuminating device according to claim 9, further comprising an anti reflection film formed on the semi column shaped protrusions.

11. The illuminating device according to claim 1, wherein the second surface is a circular cambered surface with an exterior convexity facing away from the lens array.

12. The illuminating device according to claim 1, wherein the first surface is a circular cambered surface with an exterior concavity facing towards the lens array.

13. An illuminating device, comprising a light source module, a light reflective module, a lens array and a light transmissive module, wherein:
the light source module comprises a plurality of solid state light emitting elements arranged in columns and rows;
the light reflective module comprises a plurality of hollow light reflective elements arranged in columns and rows, the light reflective elements aligned with the respective solid state light emitting elements, each of the light reflective elements configured for receiving a corresponding solid state light emitting element therein and reflecting light emitted from the solid state light emitting element to the lens array;
the lens array comprises a plurality of lenses arranged in columns and rows, the lenses aligned with and facing towards the respective light reflective elements, the plurality of lenses configured for enlarging light radiation range in the column direction and reducing light radiation range in the row direction, each of the plurality of lenses comprising a light incident surface facing towards the light reflective elements and a light emitting surface opposite to the light incident surface, the light incident surface being a concave curved surface elongated along the row direction, and the light emitting surface being a convex curved surface elongated along the column direction;
the light transmissive module comprises a first surface facing towards the lens array and a second surface opposite to the first surface, the first surface configured for receiving the light emitting from the lens array, and the second surface has a plurality of microstructures formed thereon for expanding the light radiation range in the column direction.

14. An illuminating device, comprising a light source module, a light reflective module, a lens array and a light transmissive module, wherein:
the light source module comprises a plurality of solid state light emitting elements arranged in columns and rows;
the light reflective module comprises a plurality of hollow light reflective elements arranged in columns and rows, the light reflective elements aligned with the respective solid state light emitting elements, each of the light reflective elements configured for receiving a corresponding solid state light emitting element therein and reflecting light emitted from the solid state light emitting element to the lens array;
the lens array comprises a plurality of lenses arranged in columns and rows, the lenses aligned with and facing towards the respective light reflective elements, the plurality of lenses configured for enlarging light radiation range in the column direction and reducing light radiation range in the row direction;
the light transmissive module comprises a first surface facing towards the lens array and a second surface opposite to the first surface, the first surface configured for receiving the light emitting from the lens array, and the second surface has a plurality of microstructures formed thereon for expanding the light radiation range in the column direction, the first surface comprising a plurality of semi column shaped protrusions thereon, the second surface comprising a plurality of prism protrusions formed thereon, the semi column shaped protrusions and prism protrusions extending along the row direction.

15. The illuminating device according to claim 14, further comprising an anti reflection film formed on semi column shaped protrusions.

* * * * *